United States Patent [19]
Davis

[11] 3,718,901
[45] Feb. 27, 1973

[54] TRANSDUCER AMPLIFIER SYSTEM

[75] Inventor: Warren B. Davis, Houston, Tex.

[73] Assignee: Superior Oil Company, Houston, Tex.

[22] Filed: Oct. 7, 1970

[21] Appl. No.: 78,831

[52] U.S. Cl. .................. 340/17, 340/3 E, 340/11, 320/2, 320/7, 320/25
[51] Int. Cl. .................................................. G01v 1/16
[58] Field of Search ......... 340/3 E, 11, 17; 320/7, 25, 320/2

[56] References Cited

UNITED STATES PATENTS

| | | | |
|---|---|---|---|
| 3,544,877 | 12/1970 | Erath | 320/2 |
| 3,308,365 | 3/1970 | John | 320/25 |
| 2,649,493 | 8/1953 | Temple | 320/7 UX |
| 3,281,816 | 10/1966 | Raymond | 320/25 UX |

Primary Examiner—Samuel Feinberg
Assistant Examiner—N. Moskowitz
Attorney—Arnold, White & Durkee

[57] ABSTRACT

A transducer amplifier system including a transducer having connectors affixed to the leads thereof and an amplifier circuit having mating connectors for selectively being connectable to said transducer, the amplifier circuit including a battery and semiconductive switching facilities for automatically connecting the battery to the amplifier when the transducer is connected to the amplifier and for disconnecting the battery from the amplifier when the transducer is disconnected to avoid battery drain.

10 Claims, 3 Drawing Figures

PATENTED FEB 27 1973 3,718,901

Warren B. Davis
INVENTOR

BY

Arnold, White & Durkee
ATTORNEYS

TRANSDUCER AMPLIFIER SYSTEM

BACKGROUND OF THE INVENTION

In geophysical exploration, exploration data is frequently obtained by creating a seismic disturbance such as by detonating an explosive charge, and thereafter recording the shock waves from various levels of the earth by using some form of transducer, such as seismometers or geophones, to receive the waves and convert them into electrical signals. When signals from the transducer are extremely small, pre-amplifying facilities may be necessary to raise the signal amplitude to overcome cable losses and to overcome noises picked up by the cable joining the transducer and the normal remote amplifying and recording equipment. A pre-amplifier is particularly necessary when the recording equipment is located at a great distance from the transducers.

It is common in geophysical exploration to have normal amplifying and recording equipment positioned in a vehicle which is frequently far away from the transducers or geophones which are used to detect the shock waves resulting from an explosion or other disturbance. In connecting the transducers to the recording equipment, cables are run from the vehicle and have connectors at the ends thereof which mate with connectors attached to the leads of the transducers. The transducers must be moved to various locations to obtain the necessary data for a particular area. Each time a transducer is moved, existing battery-powered pre-amplifiers must be turned off to prevent unnecessary decay of the pre-amplifier battery. When the transducers are positioned in a new location, the pre-amplifiers must be turned on in order to transmit data to the recording equipment in the distant recording vehicle. Heretofore, a switch has been provided on the pre-amplifier so that the person positioning the transducers at the desired location can turn on and off the pre-amplifier as desired. Frequently, however, the field crewmen forget to turn off the pre-amplifier battery when the transducers are being re-positioned thereby resulting in unnecessary loss of battery power and even failure to amplify the desired signals during subsequent explosions. Furthermore, even when the crewmen remember to turn off the battery when moving the transducers to another location, they sometimes forget to turn them on again after the transducers are connected to the pre-amplifier thereby resulting in a complete loss of vital and necessary information.

SUMMARY OF THE INVENTION

The subject transducer pre-amplifier system is responsive to the connection of a transducer to the amplifier system and automatically energizes the pre-amplifier when the connection is made. Furthermore, the system is responsive to the transducer being disconnected for automatically de-energizing the pre-amplifier, thereby preserving the battery. The system includes a pre-amplifier, a battery for providing energizing current to the amplifier and semiconductive switching facilities interconnecting the battery and the amplifier. The switching facilities are responsive to the connection of a transducer, geophone or seismometer to the input of the amplifier and provides a conductive DC path through the transducer to bias a semiconductive switch into a conductive condition. The system further includes capacitors at the amplifier input so that only an AC path exists between the transducer and the amplifier. Alternatively, the system may be used to operate from the output of the pre-amplifier instead of the input as previously described.

The subject system thus is capable of preserving the battery powering the remote pre-amplifier so that it has a long life. Furthermore, the system automatically energizes the pre-amplifier when a transducer is connected thereto, so that the person placing the transducers does not need to do anything after the electrical connectors are coupled together. Accordingly, the possibility of losing data because of an error of the field crewman is eliminated.

Other advantages of the present invention will be apparent from the following detailed description when considered in conjunction with the following detailed drawings, which drawings form a part of this specification. It is to be noted, however, that the drawings illustrate only typical embodiments of the invention and are therefore not to be considered limiting of its scope, for the invention may admit to other equally effective embodiments.

DESCRIPTION OF THE PREFERRED EMBODIMENTS

Figure 1:
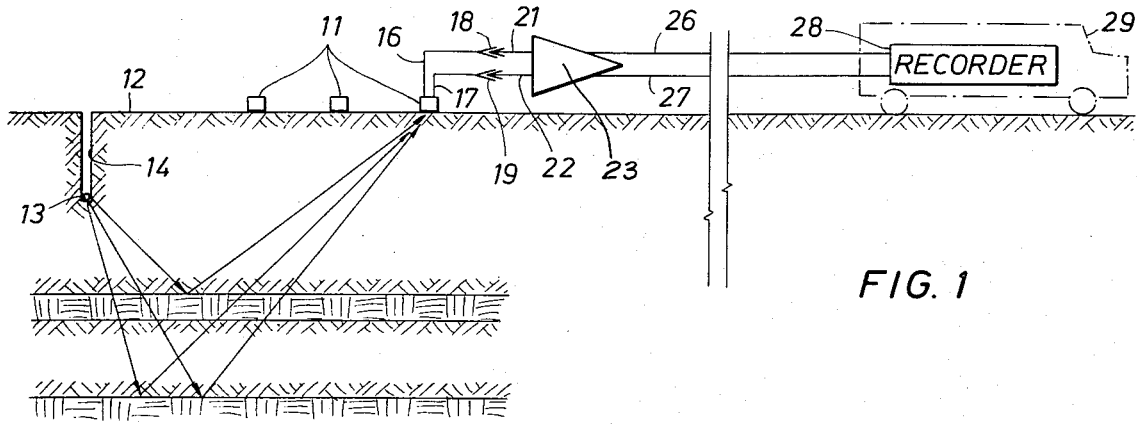
FIG. 1 is a representation of a typical arrangement for obtaining geophysical data utilizing an explosion to provide shock waves in the earth.

Referring to FIG. 1, there is shown a typical application of the subject transducer pre-amplifier system. A plurality of transducers 11 are positioned at particular locations on the ground 12 to record the shock waves which are set off by, for example, detonating an explosive charge 13 located in a shot hole 14 in the ground. Each transducer 11 has terminals 16 and 17 which are connected to conventional quick connect couplings or connectors 18 and 19 respectively. The other ends of the connectors 18 and 19 are connected to leads 21 and 22 respectively which are connected to a pre-amplifier circuit generally designated as 23. A pair of wires 26 and 27 connect the transducers 11 and pre-amplifiers 23 to suitable remote amplifying and recording facilities generally designated as 28, which are typically located in a mobile unit or vehicle 29 which is often far away from the position of the transducers 11. When the explosive charge 13 is set off, data is recorded by the facilities 28. Afterwards, the transducers 11 are disconnected from the connectors 18 and 19 and are moved to another position. At that time, the connectors 18 and 19 are again connected and further charges are set off to obtain the desired geophysical data.

Figure 2:
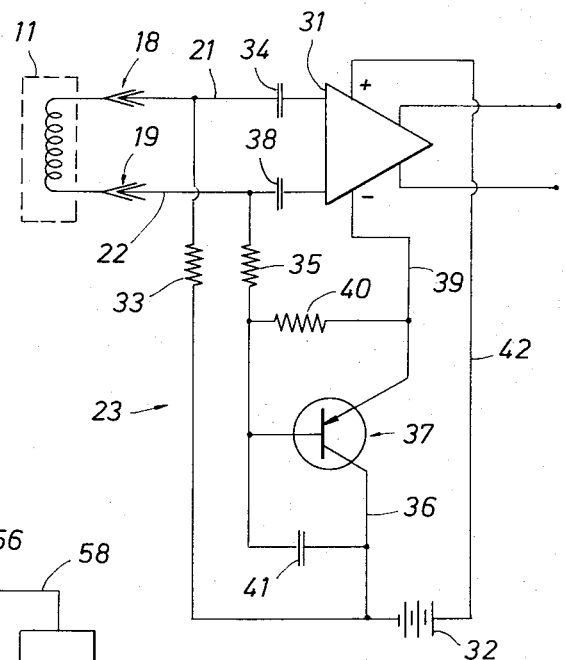
FIG. 2 is a detailed circuit diagram of a transducer pre-amplifier system which embodies the principles of the present invention.

Referring now to FIG. 2, there is shown a transducer 11 connected through connectors 18 and 19 to the pre-amplifier circuit 23. The circuit 23 includes an amplifier 31 having leads 21 and 22 connected to the connectors 18 and 19 respectively. A battery 32 is provided for supplying power to the amplifier 31 when the connectors 18 and 19 are connected thereby coupling the transducer 11 to the input of amplifier 31. The negative terminal of the battery 32 is applied to the connector 18 through resistance 33. When the connector 18 is opened, the transducer 11 is disconnected from the control circuit 23. A capacitor 34 in lead 21 provides an open circuit to DC so that only AC current is applied to the input of amplifier 31. When the connectors 18 and 19 are coupled to their mating parts, current flows through the transducer 11 and through resistance 35 to the base of a semiconductive switching device, such as transistor 37. A capacitor 38 provides an open circuit in lead 22 so that DC signals are blocked and not applied to the input of amplifier 31. The current flow applied to the base of the transistor 37 and the bias determined by resistors 35 and 40 is sufficient to cause the transistor to conduct. Thus, the amplifier 31 is powered through completion of the battery circuit via lead 36, transistor 37, lead 39, amplifier 31 and lead 42. The resistor 40 is used to bias the transistor 37 off and also to discharge capacitor 41 which is used as a low pass filter to prevent the transducer signal from turning the transistor 37 on and off.

In operation of the system, when the transducer 11 is disconnected, there is an open circuit between mating parts of connectors 18 and 19, and the bias applied between the base and emitter of transistor 37 prevents conduction, thereby preventing the negative potential of battery 32 from being applied to the amplifier 31 and breaking the battery circuit to the amplifier 31. When the transducer 11 is connected to the amplifier circuit 23, the negative potential of battery 32 is applied through resistor 33, connector 18, transducer 11, connector 19 and resistor 35, to the base of the transistor 37. The current applied to the base of transistor 37 is sufficient to cause the transistor 37 to conduct, completing the battery circuit to the amplifier 31 through lead 36, transistor 37, and lead 39. When the transducer 11 is disconnected from the circuit 23, the resistor 40 biases the transistor 37 off and also discharges the capacitor 41. This turns the amplifier 31 off and maintains the amplifier turned off until a transducer 11 is again connected to the connectors 18 and 19. The subject system preserves the battery and prevents drain so that sufficient power is available to amplify the transducer signals, and furthermore, the system precludes the possibility of any data being lost because the amplifier was not turned on.

Figure 3:
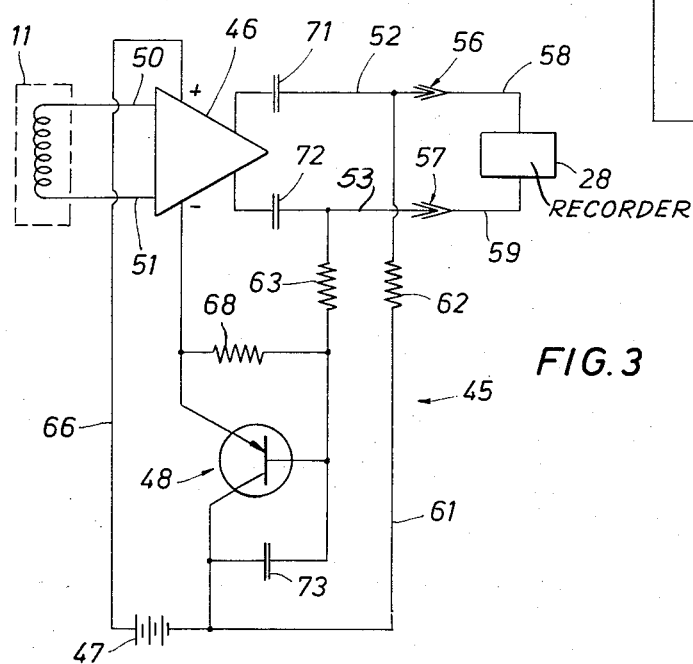
FIG. 3 is an alternative embodiment of the present invention wherein connections are made to the output of the pre-amplifier.

Referring now to FIG. 3, there is shown an alternative circuit generally designated as 45 wherein the connectors 18 and 19 are connected to the output of the pre-amplifier instead of the input thereof. Circuit 45 includes an amplifier 46 connected to a battery 47 through a transistor 48. The amplifier 46 is connected to a transducer 11 by leads 50 and 51. A pair of output leads 52 and 53 from the amplifier 46 are connected to connectors 56 and 57. Leads 58 and 59, connected to the connectors 56 and 57 respectively, are connected to the remote amplifying and recording facilities 28. When the connectors 56 and 57 are disconnected from the cables 58 and 59, the transistor 48 is biased off and the amplifier 46 is consequently turned off. When the mating parts of the connectors 56 and 57 are coupled together joining the leads 52 and 58, and the leads 53 and 59, the negative potential of the battery 47 is applied through lead 61, resistor 62, connector 56, across the load 28, connector 57, and resistor 63 to the base of the transistor 48. Base to emitter bias is determined by resistors 63 and 68. The potential current applied to the base of the transistor 48 is sufficient to cause the transistor to conduct thereby completing the battery circuit through lead 66, amplifier 46, transistor 48, and battery 47 to turn the amplifier on and amplify the signals produced by the transducer 11. Capacitors 71, 72 and 73 perform substantially the same function as capacitors 34, 38 and 41 in FIG. 2, as previously described.

While the circuits described hereinabove have been described in reference to a battery having the negative side thereof connected to a transistor, the circuit may also be arranged so that the positive side of the battery is connected to a transistor having an opposite polarity, or to another semiconductive switching device. Furthermore, while the above embodiments have been described as amplifying signals only from a single transducer, they are also applicable for amplifying signals from a plurality of transducers either connected in parallel, or in series, or in a series-parallel combination.

It is to be understood that the embodiments described and illustrated herein are merely illustrative of the principles of this invention and that numerous other arrangements and modifications may be made without departing from the spirit and scope of this invention.

WHAT IS CLAIMED IS:

1. A transducer amplifier system comprising:
   an amplifier;
   connector means for electrically interconnecting a transducer to said amplifier;
   terminals for connection of a battery for powering said amplifier; and
   semiconductive control means responsive to the interconnection of said transducer and amplifier for connecting said battery to said amplifier, and responsive to the disconnection of said transducer and said amplifier for disconnecting said battery from said amplifier.

2. A transducer amplifier system as set forth in claim 1 wherein said semiconductive control means includes a semiconductive switch which is rendered conductive by a DC circuit completed through said transducer.

3. A transducer amplifier system as set forth in claim 2 including means connected to the input of said amplifier for blocking DC signals.

4. A transducer amplifier system as set forth in claim 3 including means for preventing the signals generated by said transducer from operating said semiconductive switch.

5. A battery powered amplifier system which can be selectively connected to a load, comprising:
   an amplifier;
   a battery for energizing said amplifier;
   connector means for interconnecting said load and said amplifier;
   semiconductive control means responsive to the interconnection of said load and amplifier for energizing said amplifier and responsive to the disconnection of said load and amplifier for de-energizing said amplifier.

6. A battery-powered amplifier system as set forth in claim 5 wherein said load is connected by said connector means to the output of said amplifier and said semiconductive control means includes a semiconductive switch which is rendered conductive by the application thereto of a DC signal provided upon interconnection of said load to the output of said amplifier.

7. A battery-powered amplifier system as set forth in claim 6 including means connected to the output of said amplifier for blocking DC signals.

8. A transducer amplifier system comprising:
an amplifier;
connector means for electrically connecting a transducer to said amplifier;
a battery;
a first circuit path connecting said battery and said amplifier and including a transistor which is normally biased to be nonconductive; and
a second circuit path connecting said battery and said connector means, completion of said second circuit path by the connection of said transducer to said amplifier causing a DC potential to be applied to said transistor rendering said transistor conductive to complete said first circuit path and energize said amplifier.

9. A transducer amplifier system as set forth in claim 8 including means for preventing the application of DC signals to said amplifier.

10. A transducer amplifier system as set forth in claim 8 wherein said second circuit path is connected to the base of said transistor for controlling the operation of said transistor.

* * * * *